(12) United States Patent
Wang et al.

(10) Patent No.: US 7,843,644 B1
(45) Date of Patent: Nov. 30, 2010

(54) COMPACT FREE-SPACE WDM DEVICE WITH ONE-SIDED INPUT/OUTPUT PORTS

(75) Inventors: Daoyi Wang, Sunnyvale, CA (US); Yao Li, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 18 days.

(21) Appl. No.: 11/669,947

(22) Filed: Feb. 1, 2007

(51) Int. Cl.
  *G02B 27/30* (2006.01)
(52) U.S. Cl. .................................................. 359/641
(58) Field of Classification Search ................. 359/641, 359/871; 362/549
  See application file for complete search history.

(56) References Cited

U.S. PATENT DOCUMENTS

| | | | |
|---|---|---|---|
| 4,244,045 A | 1/1981 | Nosu et al. | |
| 5,583,683 A | 12/1996 | Scobey | |
| 5,786,915 A | 7/1998 | Scobey | |
| 6,198,857 B1 | 3/2001 | Grasis | |
| 6,856,435 B2 * | 2/2005 | Richard et al. | 398/43 |
| 2003/0128437 A1 * | 7/2003 | Sato et al. | 359/641 |
| 2003/0198431 A1 * | 10/2003 | Chen et al. | 385/21 |
| 2006/0256446 A1 * | 11/2006 | Tanaka et al. | 359/641 |

\* cited by examiner

*Primary Examiner*—Ricky L Mack
*Assistant Examiner*—Mahidere S Sahle
(74) *Attorney, Agent, or Firm*—Wixi Sino IP Agency, Ltd.; Joe Zheng

(57) ABSTRACT

Techniques for designing compact free-space optical device with all input/output ports on one side are disclosed. Instead of folding a fiber, a beam folding means is provided to turn a light beam to significantly reduce the size of the device. In one embodiment, there are a first collimator, a second collimator, and a beam folding means to turn a light beam from the first collimator back to the second collimator by two turns so that a first light path from the first collimator to the beam folding means and a second light path from the second collimator to the beam folding means are parallel. A substrate is provided to which the first and second collimators and filters are boned thereto.

15 Claims, 8 Drawing Sheets

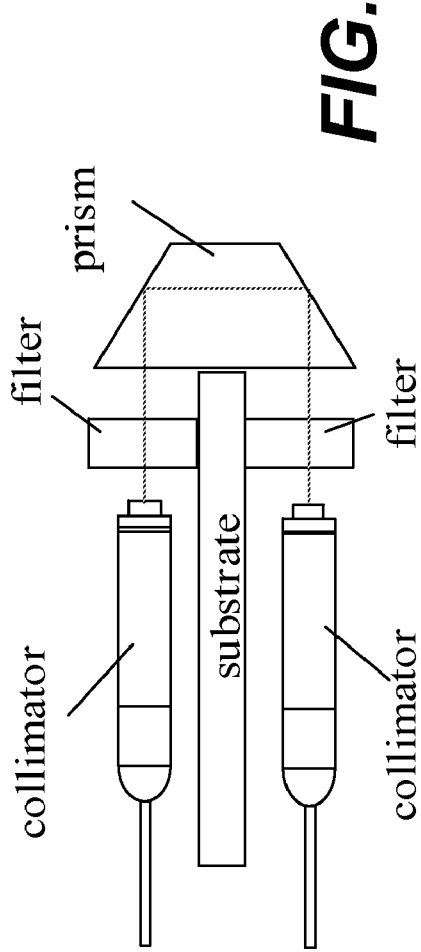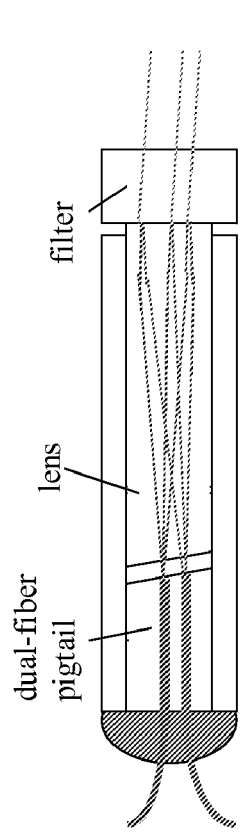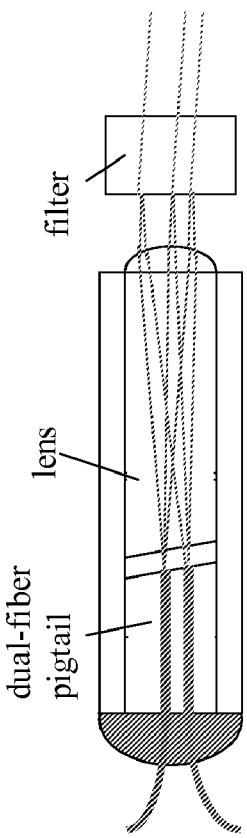

COMPACT FREE-SPACE WDM DEVICE WITH ONE-SIDED INPUT/OUTPUT PORTS

BACKGROUND OF THE INVENTION

1. Field of the Invention

The invention is generally related to the area of optical communications. In particular, the present invention is related to optical wavelength multiplexing or add/drop devices with high reflection channel isolation and the method for making the same in compact size.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and perhaps more) separate wavelengths or channels of data can be multiplexed into a light stream transmitted on a single optical fiber. To take the benefits and advantages offered by the WDM system, there require many sophisticated optical network elements.

Optical add/drop and multiplexer/demultiplexer devices are those elements often used in optical systems and networks. For example, an exchanging of data signals involves the exchanging of matching wavelengths from two different sources within an optical network. In other words, an add/drop device can be advantageously used for the multi-channel signal for dropping a wavelength while simultaneously adding a channel with a matching wavelength at the same network node. Likewise, for transmission through a single fiber, a plurality of channel signals are combined via a multiplexer to be a multiplexed signal that is eventually separated or demultiplexed via a demultiplexer.

A typical prior art free-space WDM Demux, as disclosed in U.S. Pat. No. 5,583,683, is duplicated in FIG. 1. In the device 100, a multiple wavelength light traveling in a fiber is separated into multiple narrow spectral bands directed respectively to individual channels. At each of the multiple ports, a dielectric thin film filter transmits a specified wavelength sub-band signal of the multiple-wavelength light collimated and passed by a channel port, and reflects the other wavelengths signals. The remaining multiple wavelengths signals continue to a next channel port, where the in-band signal is transmitted out and the other signals are reflected and propagate along the main path. After multiple bounces, multiple channel signals are respectively demultiplexed.

An OADM (Optical Add/Drop Multiplexer) device works in a slightly different manner compared with a Mux/Demux device. FIG. 2 shows a typical prior art free-space WDM OADM, duplicated from U.S. Pat. No. 6,198,857. In the OADM device 200, at the drop channel port, a thin film filter splits the multiple-wavelength signal according to its spectral characteristics. At the add channel port, the filter does not drop any signals, only reflects all the main-stream signals from the previous channel, meanwhile, inserts a new band signal to the path.

All these free-space devices have the advantages of low loss, reliability and compactness. Compared with conventional three-port cascading modules, the dimension of the free-space devices is significantly reduced as fiber routing in three-port modules is replaced with collimated beams in the free-space devices, thus the routing overhead is skipped. For a fiber, the bend radius is not allowed to be too small. For example, for a widely used SMF-28e fiber, the minimum bending radius is about 30 mm. When being routed, the fiber roll wastes a specified space, 60 mm in diameter for SMF-28e. Without the fiber routing, a free-space WDM device box can be even smaller than a square of 30 mm.

As shown in FIG. 1 and FIG. 2, the fiber input/output ports are from both sides of a package (e.g., a mechanical box). In the process of handling the fiber, due to the minimum radius limitation, the space waste is doubled as shown FIG. 3A. One of the features in the present invention is to overcome such double-sided ports by one-sided fiber fan-out as shown in FIG. 3B with the same routing criteria because routing with a one-sided device saves a half of routing space overhead. In one embodiment of the present invention, as will be detailed below, the I/O ports are on one side of the box, even routing may be eliminated as shown in FIG. 3C.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to compact free-space optical device with all input/output ports on one side of the device. According to one aspect of the present invention, instead of folding a fiber, a beam folding means is provided to turn a light beam to significantly reduce the size of the device. According to another aspect, there are a first collimator, a second collimator, and a beam folding means to turn a light beam from the first collimator back to the second collimator by two turns so that a first light path from the first collimator to the beam folding means and a second light path from the second collimator to the beam folding means are parallel. A substrate is provided to which the first and second collimators and filters are boned thereto.

According to one embodiment, the present invention is a free space optical apparatus that comprises: a first collimator with a dual-fiber pigtail acting as a common (C) port and a reflection (R) port; a second collimator with a single fiber as a transmission (T) port; and a beam folding means to turn a light beam from the first collimator back to the second collimator by two turns so that a first light path from the first collimator to the beam folding means and a second light path from the second collimator to the beam folding means are parallel. When the apparatus is used as a multiplexer to add a signal at a selected wavelength $\lambda_K$ to other signals at wavelengths other than the selected wavelength $\lambda_K$, the transmission port receives a light beam at the selected wavelength $\lambda_K$ that is to be multiplexed into a group of beams at wavelengths $\lambda_1, \lambda_2, \ldots \lambda_N$ excluding the selected wavelength $\lambda_K$ coupled in from the reflection port, the common port subsequently produces a multiplexed signal including all wavelengths ($\lambda_1, \lambda_2, \ldots \lambda_K, \ldots \lambda_N$). When the apparatus is used to demultiplex signals, the common port receives a group of signals with wavelengths $\lambda_1, \lambda_2, \ldots \lambda_K, \ldots \lambda_N$. The transmission port passes a signal with the selected wavelength $\lambda_K$ while the reflection port subsequently bypasses the rest of the input signals wavelengths $\lambda_1, \lambda_2, \ldots \lambda_N$ except for the selected wavelength $\lambda_x$.

One of the objects, features, advantages of the present invention is to provide optical devices that are amenable to small footprint, broad operating wavelength range, enhanced impact performance, lower cost packaging, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

FIG. 8 shows an embodiment with one half set being at the upper level and the other half set being at the lower level, with this design, besides routing space, the device length may be further minimized;

FIG. 9A and FIG. 9B shows a further reduction in dimension by application of dual-port collimators.

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
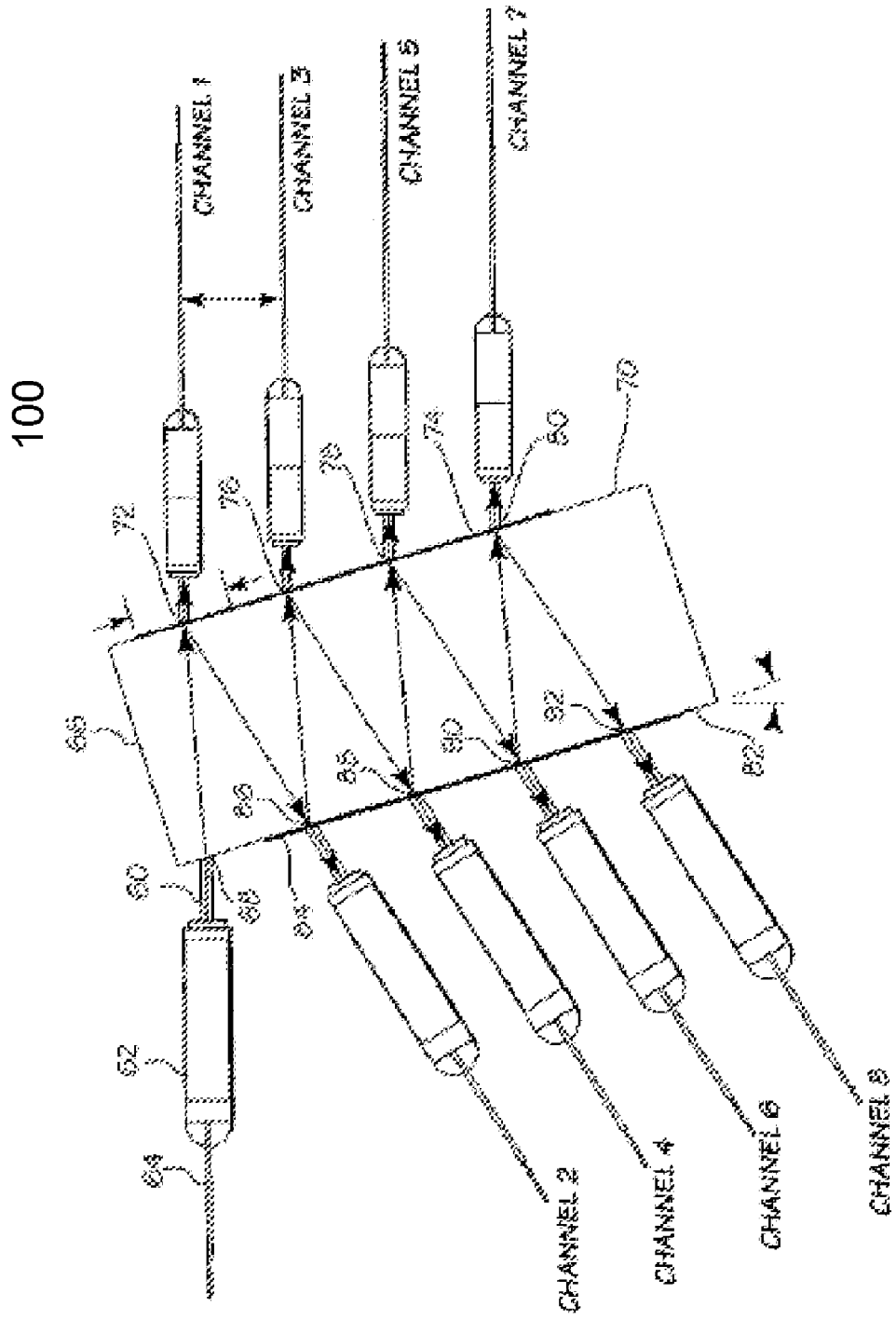
FIG. 1 (prior art) duplicates a figure from U.S. Pat. No. 5,583,683.
Figure 2:
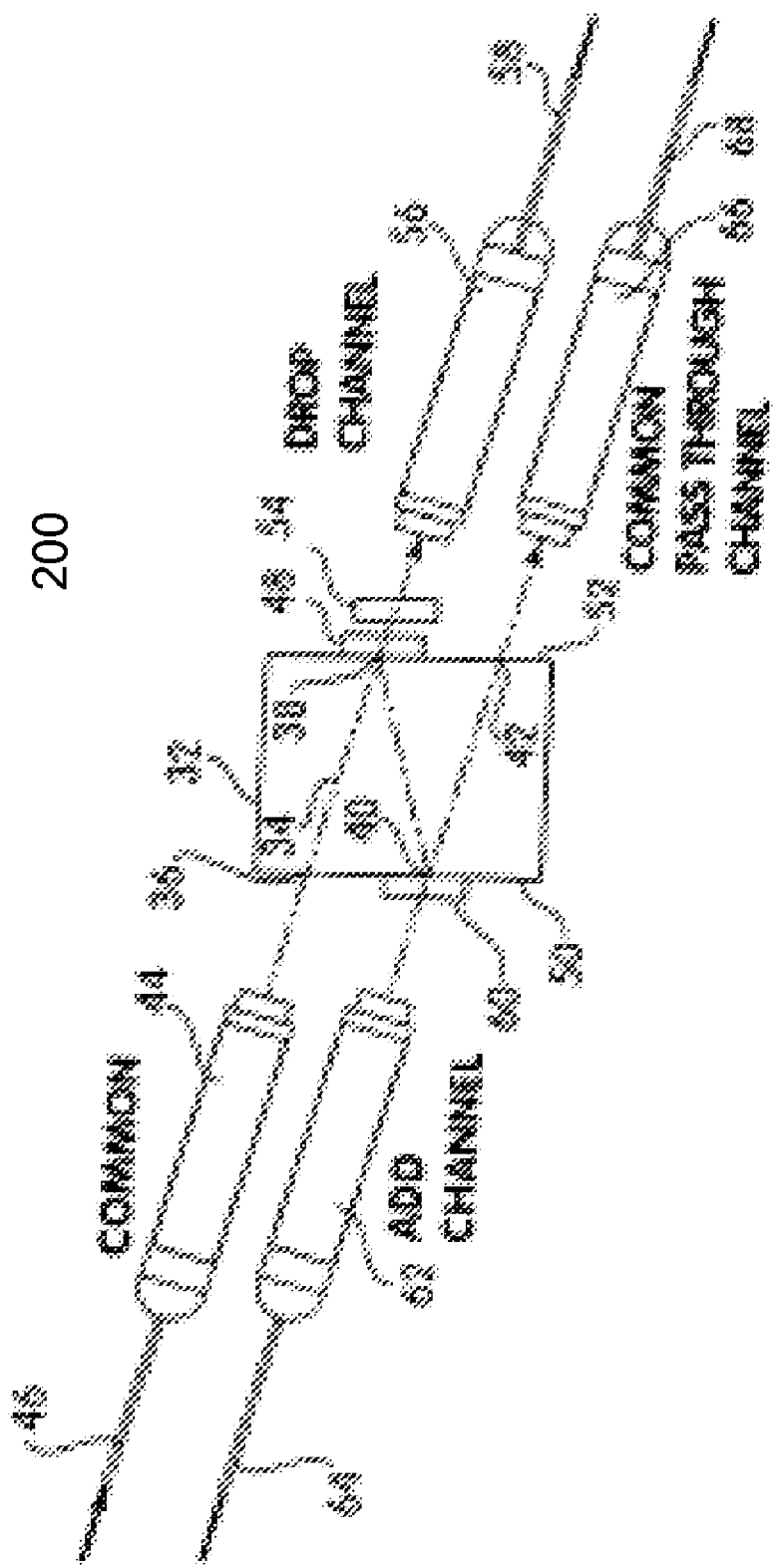
FIG. 2 (prior art) duplicates a typical prior art free-space WDM OADM, duplicated from U.S. Pat. No. 6,198,857
Figure 3A:
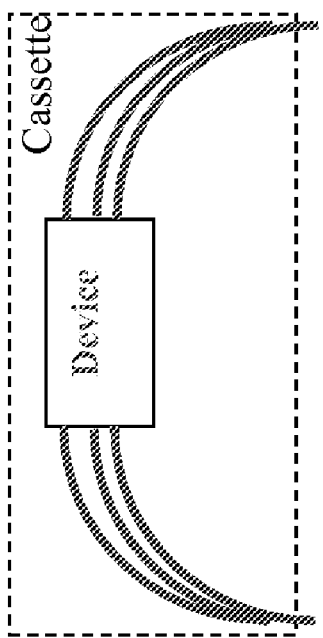
FIG. 3A (prior art) shows that fiber input/output ports are from both sides of a package (e.g., a mechanical box) and the space waste is doubled.
Figure 3C:
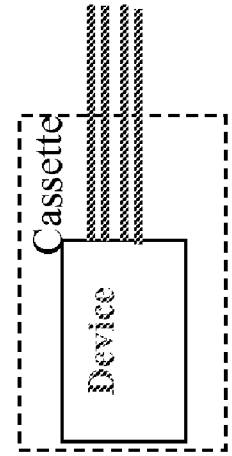
FIG. 3C, used in one embodiment of the present invention, shows the I/O ports are on one side of the box, even routing may be eliminated.
Figure 3B:
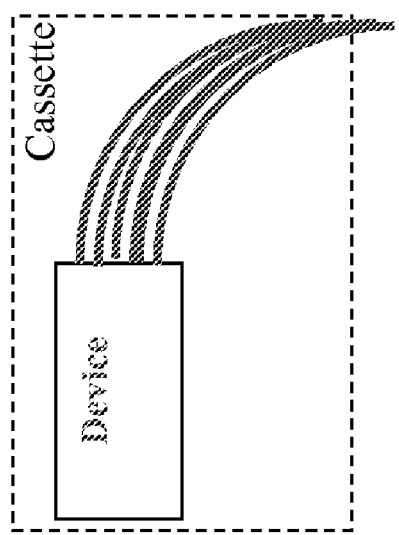
FIG. 3B shows double-sided ports by one-sided fiber fan-out with the same routing criteria because routing with a one-sided device saves a half of routing space overhead.
Figure 4:
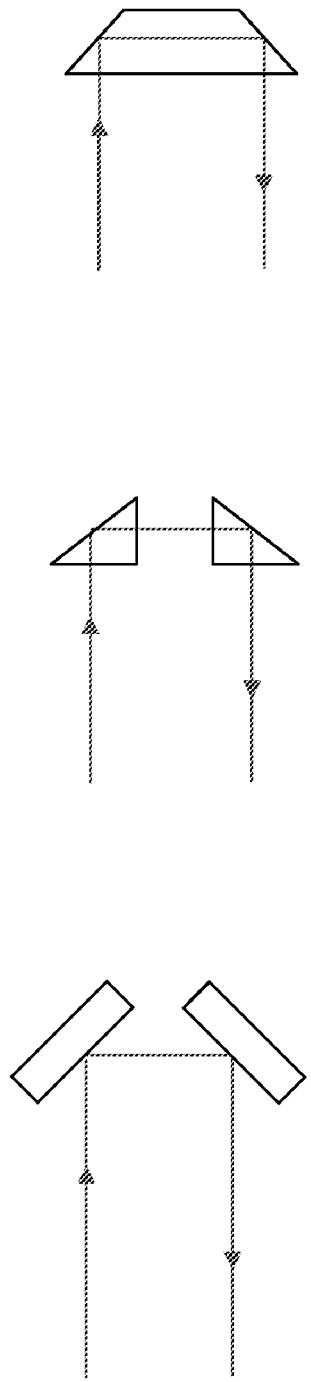
FIG. 4 shows three examples of such beam folding components (e.g., prisms or mirrors)
Figure 5:
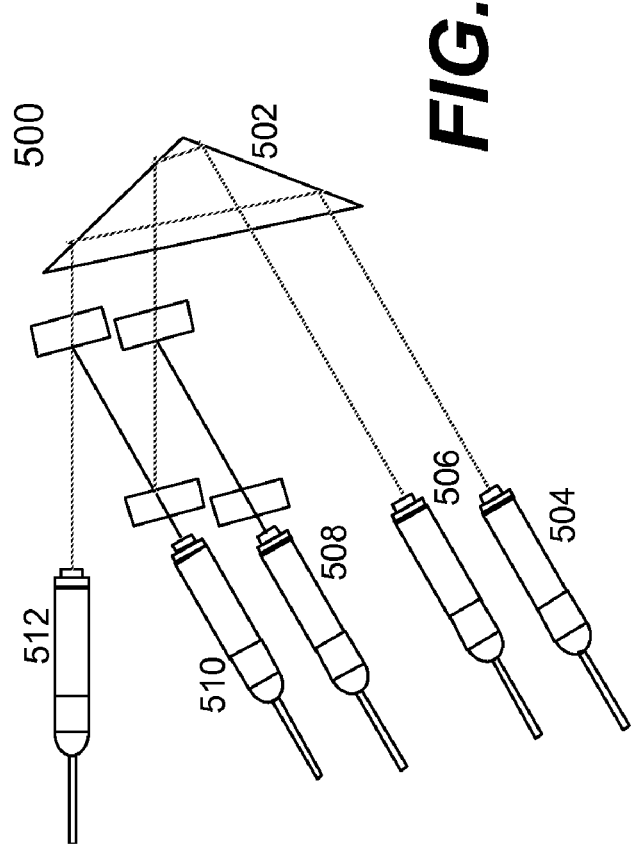
FIG. 5 shows an exemplary embodiment employing one of such folding components.

Referring now to the drawings, in which like numerals refer to like parts throughout the several views. According to one embodiment of the present invention, an exemplary one-side optical layout is realized by one or more beam folding components. FIG. 4 shows three examples of such beam folding components (e.g., prisms or mirrors). FIG. 5 shows an exemplary embodiment employing one of such folding components. As shown, a right side beam is folded by a prism 502. Thus fan-out collimators 504 and 506 that ought to be on the opposite side are moved to the same side of input collimators 508, 510, and 512. It is easy to implement such one-side devices but the lateral dimension thereof may be still too large, leading to a wide layout or a wide package.

Figure 6A:
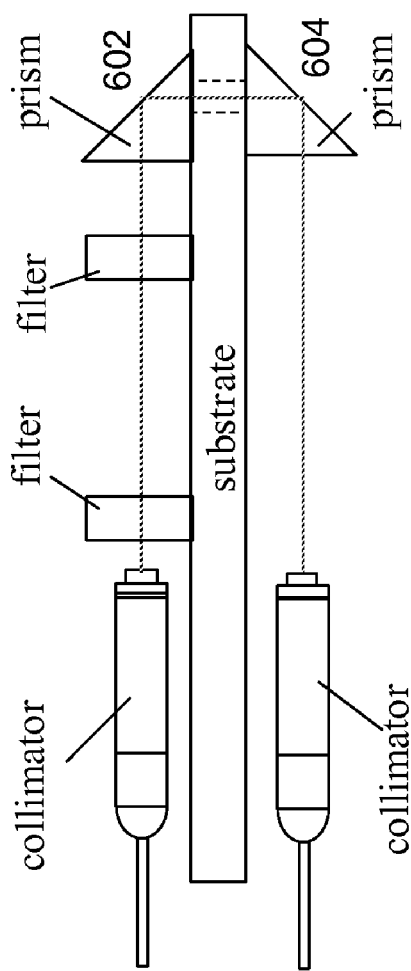
FIG. 6A shows an exemplary embodiment using a beam being folded back with a pair of right prisms (or mirrors)
Figure 6B:
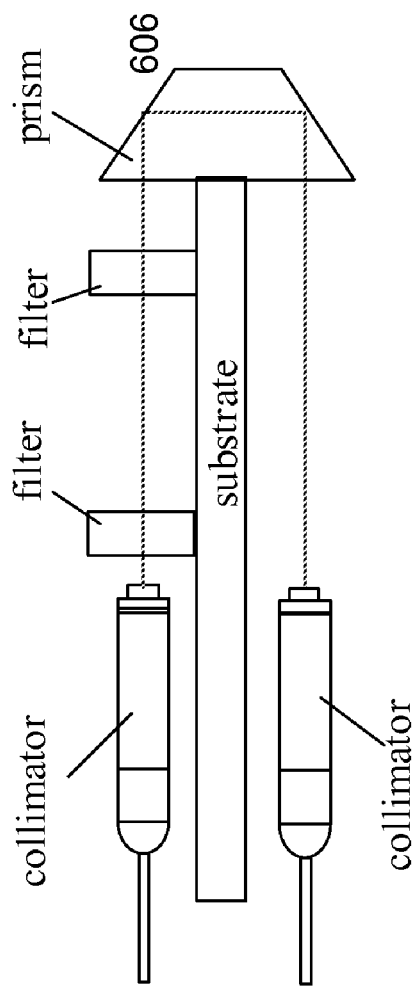
FIG. 6B shows an exemplary embodiment using a trapezoidal prism.
Figure 6C:
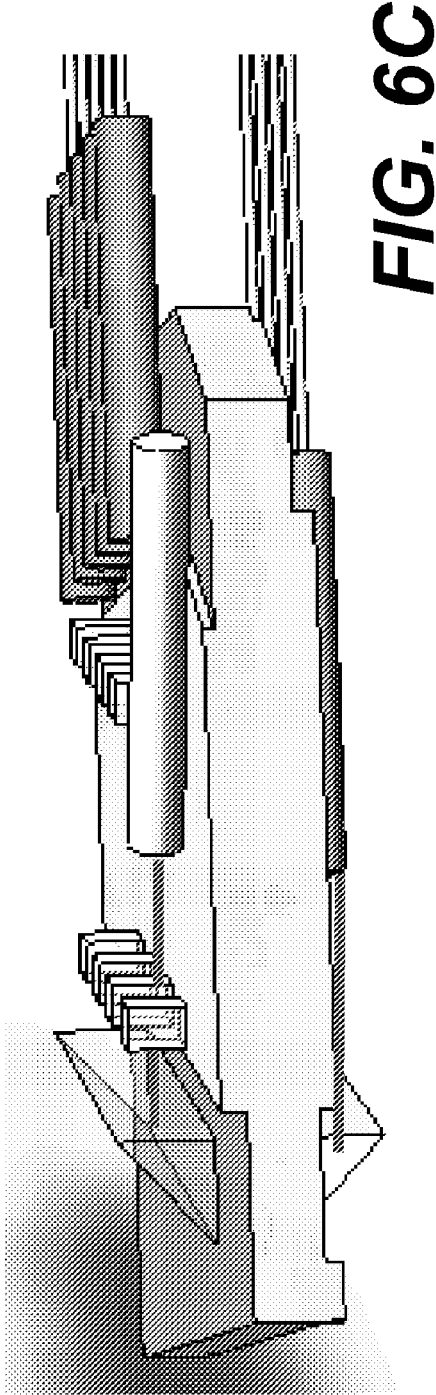
FIG. 6C shows an 8-channel free-space Demux with an exemplary dual-prism design in accordance with the present invention.

In another embodiment as shown in FIG. 6A, a beam is folded back with a pair of right prisms (or mirrors) 602 and 604. To facilitate the description of the embodiment, it is assumed that a beam plane is shown in FIG. 6A. The beam is folded vertically on the beam plane. Thus the only sacrifice for a device using the one-side IP ports is a small increase in its height that is determined by the collimators and prism height, usually 1 mm-2 mm. In addition, using two prisms can provide flexibility in optical adjustment. If two prisms and other supporting parts (e.g., the substrate) can be accurately positioned consistently, two prisms may be replaced with only one piece of prism 606 (e.g., a trapezoidal prism) as shown in FIG. 6B. FIG. 6C shows an 8-channel free-space Demux with dual-prism design.

Figure 7:
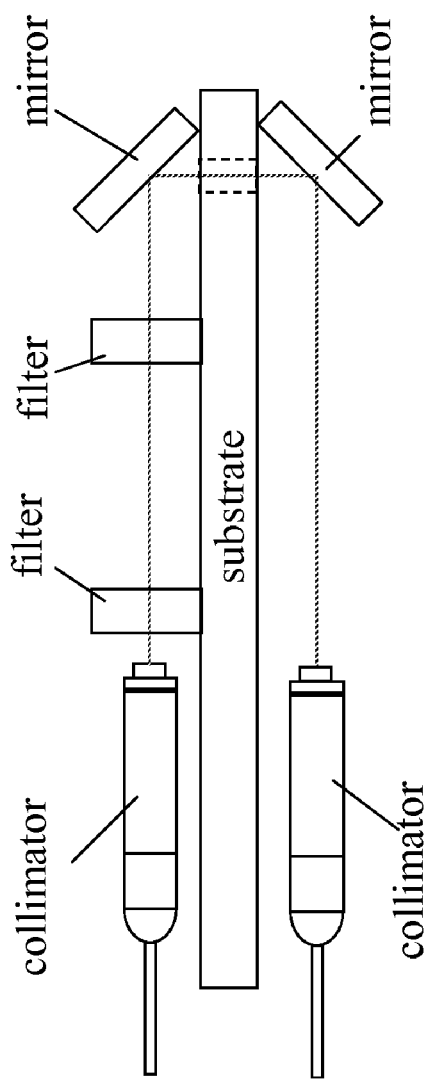
FIG. 7 shows an embodiment similar to the embodiments shown in FIG. 6A and FIG. 6B, except that two mirrors are being used to substitute the prism(s)

The design shown in FIG. 7 is similar to the embodiments shown in FIG. 6A and FIG. 6B, except that two mirrors are being used to substitute the prism(s).

In the aforementioned designs, all the filters and input side collimators are on one plane, namely above the substrate, which minimizes the assembling complexities and increases the process stability. For the upper level, the assembly processes are very close to those of conventional free-space devices. After the upper level is finished and bonded to the substrate, the substrate is turned around. After that, the remaining collimators or parts are assembled and bonded to the substrate. Unlike the filters that are cascaded one by one, the collimators are separated by the substrate. So assembling the lower level collimators does not affect the optics on the upper level.

With the advanced manufacturing fixtures and processes, the optics on the upper level may be divided into two halves. As shown in FIG. 8, one half is at the upper level and the other half is at the lower level. With this design, besides routing space, the device length may be further minimized.

A further reduction in dimension is realized by application of dual-port collimators as shown in FIG. 9A and FIG. 9B. In operation, a light beam from one fiber of the dual-fiber pigtail is collimated by a lens and then hits a filter. The filter transmits the in-band spectral signals but reflects all other signals back to the same lens. The reflected light is focused to the other fiber of the pigtail and coupled out as an express signal. The lens in this assembly can be of any type of lens, including a regular lens or a lens made of special material or by special process (GRIN lens, etc). The filter can be directly bonded to a substrate for an integrated assembly or bonded together with a dual-port collimator to form a sub-assembly. In addition to space saving, a dual-port collimator plus a filter makes better optical performance as the filter incidence angle is small.

Figure 10:
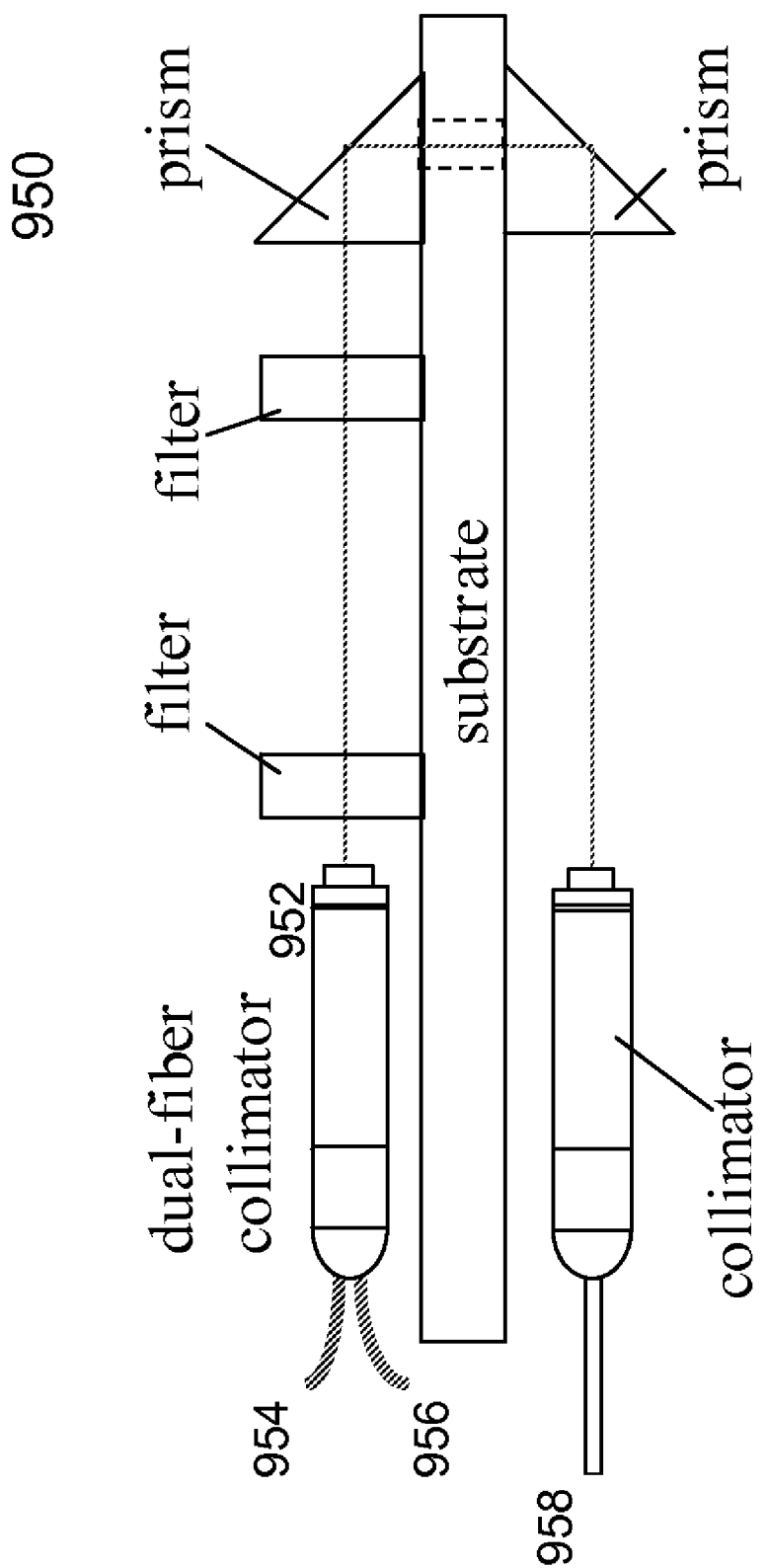
FIG. 10 shows a typical application of using a dual-port collimator in a WDM device.

FIG. 10 shows a typical application of using a dual-port collimator in a WDM device 950. The input single collimator is replaced with a dual-port collimator 952. The optical device 950 includes a common (C) port 954, a reflection (R) port 956, and a transmission (T) port 958. When the device 950 is used as a multiplexer (i.e., to add a signal at a selected wavelength $\lambda_K$ to other signals at wavelengths other than the selected wavelength $\lambda_K$), the T-port 958 receives a light beam at the selected wavelength $\lambda_K$ that is to be multiplexed into a group of beams at wavelengths $\lambda_1, \lambda_2, \ldots \lambda_N$ excluding the selected wavelength $\lambda_K$ coupled in from the R-port 956. The filters 960 and 962 are configured to pass only the selected wavelength $\lambda_K$ and reflect others. The C-port 954 subsequently produces a multiplexed signal including all wavelengths ($\lambda_1, \lambda_2, \ldots \lambda_K, \ldots \lambda_N$).

Likewise, when the device 950 is used to demultiplex signals, the C-port 954 receives a group of signals with wavelengths $\lambda_1, \lambda_2, \ldots \lambda_K, \ldots \lambda_N$. The T-port 958 passes a signal with the selected wavelength $\lambda_K$ while the R-port 956 subsequently bypasses the rest of the input signals wavelengths $\lambda_1, \lambda_2, \ldots \lambda_N$ except for the selected wavelength $\lambda_x$. The filters 960 and 962 are configured to pass only the selected wavelength $\lambda_K$ and reflect others.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A free space optical apparatus comprising:
a substrate;
a first collimator;
a second collimator, both of the first and the second collimators disposed on opposite sides of the substrate and bonded respectively in parallel to two opposite surfaces of the substrate;
a beam folding means to turn a light beam from the first collimator back to the second collimator by two turns of 90 degrees so that a first light path on one side of the substrate from the first collimator to the beam folding means and a second light path on another side of the substrate from the second collimator to the beam folding means remains parallel; and
two filters disposed along the first light path before the beam folding means, the first and second collimators and the two filters are bonded to the substrate.

2. The apparatus of claim 1, wherein the beam folding means includes first and second prisms, the first prism provided to cause one of the two turns, and the second one provided to cause another one of the two turns.

3. The apparatus of claim 2, wherein either one of the first and second prisms is a right prism.

4. The apparatus of claim 2, wherein the two filters are positioned in the first light path.

5. The apparatus of claim 2, wherein the two filters are positioned respectively in the first and second light paths to further reduce dimension of the apparatus.

6. The apparatus of claim 1, wherein the beam folding means is a trapezoidal prism that finishes both of the two turns therein.

7. The apparatus of claim 1, wherein the first collimator includes a dual-fiber pigtail.

8. A free space optical apparatus comprising:
a substrate;
a first collimator with a dual-fiber pigtail acting as a common (C) port and a reflection (R) port;
a second collimator with a single fiber as a transmission (T) port, both of the first and the second collimators disposed on opposite sides of the substrate and bonded respectively in parallel to opposite surfaces of the substrate;
a beam folding means to turn a light beam from the first collimator back to the second collimator by two turns of 90 degrees so that a first light path from the first collimator on one side of the substrate to the beam folding means and a second light path from the second collimator on the other side of the substrate to the beam folding means are parallel;
two filters disposed along the first light path before the beam folding means, the first and second collimators and the two filters are bonded to the substrate,
wherein when the apparatus is used as a multiplexer to add a signal at a selected wavelength $\lambda_K$ to other signals at wavelengths other than the selected wavelength $\lambda_K$, the transmission port receives a light beam at the selected wavelength $\lambda_K$ that is to be multiplexed into a group of beams at wavelengths $\lambda_1, \lambda_2, \ldots \lambda_N$ excluding the selected wavelength $\lambda_K$ coupled in from the reflection port, the common port subsequently produces a multiplexed signal including all wavelengths ($\lambda_1, \lambda_2, \ldots \lambda_K, \ldots \lambda_N$), and
wherein when the apparatus is used to demultiplex signals, the common port receives a group of signals with wavelengths $\lambda_1, \lambda_2, \ldots \lambda_K, \ldots \lambda_N$, the transmission port passes a signal with the selected wavelength $\lambda_K$ while the reflection port subsequently bypasses the rest of the input signals wavelengths $\lambda_1, \lambda_2, \ldots \lambda_N$ except for the selected wavelength $\lambda_K$.

9. The apparatus of claim 8, further including two filters and a substrate to which the first and second collimators and the two filters are bonded thereto before the beam folding means.

10. The apparatus of claim 9, wherein the beam folding means includes first and second prisms, the first prism provided to cause one of the two turns, and the second one provided to cause another one of the two turns.

11. The apparatus of claim 10, wherein either one of the first and second prisms is a right prism.

12. The apparatus of claim 10, wherein the two filters are positioned in the first light path.

13. The apparatus of claim 10, wherein the two filters are positioned respectively in the first and second light paths to further reduce dimension of the apparatus.

14. The apparatus of claim 9, wherein the beam folding means is a trapezoidal prism that finishes both of the two turns therein.

15. The apparatus of claim 9, wherein the first collimator includes a dual-fiber pigtail.

* * * * *